March 6, 1934. A. W. KRESSIN 1,950,056
VARIABLE SPEED TRANSMISSION
Filed Oct. 21, 1932   5 Sheets-Sheet 3
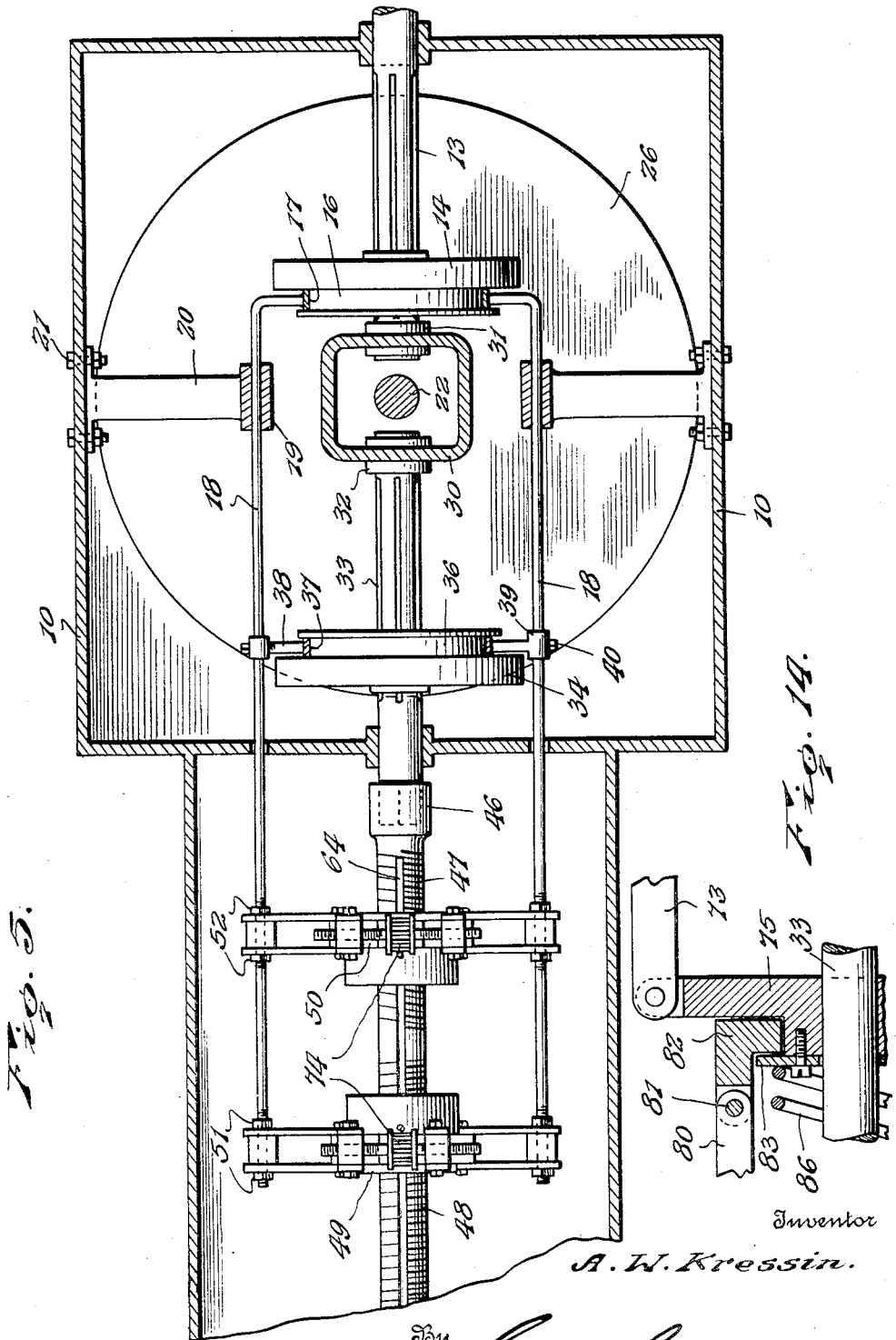
Inventor
A. W. Kressin.
By Lacey&Lacey,
Attorneys

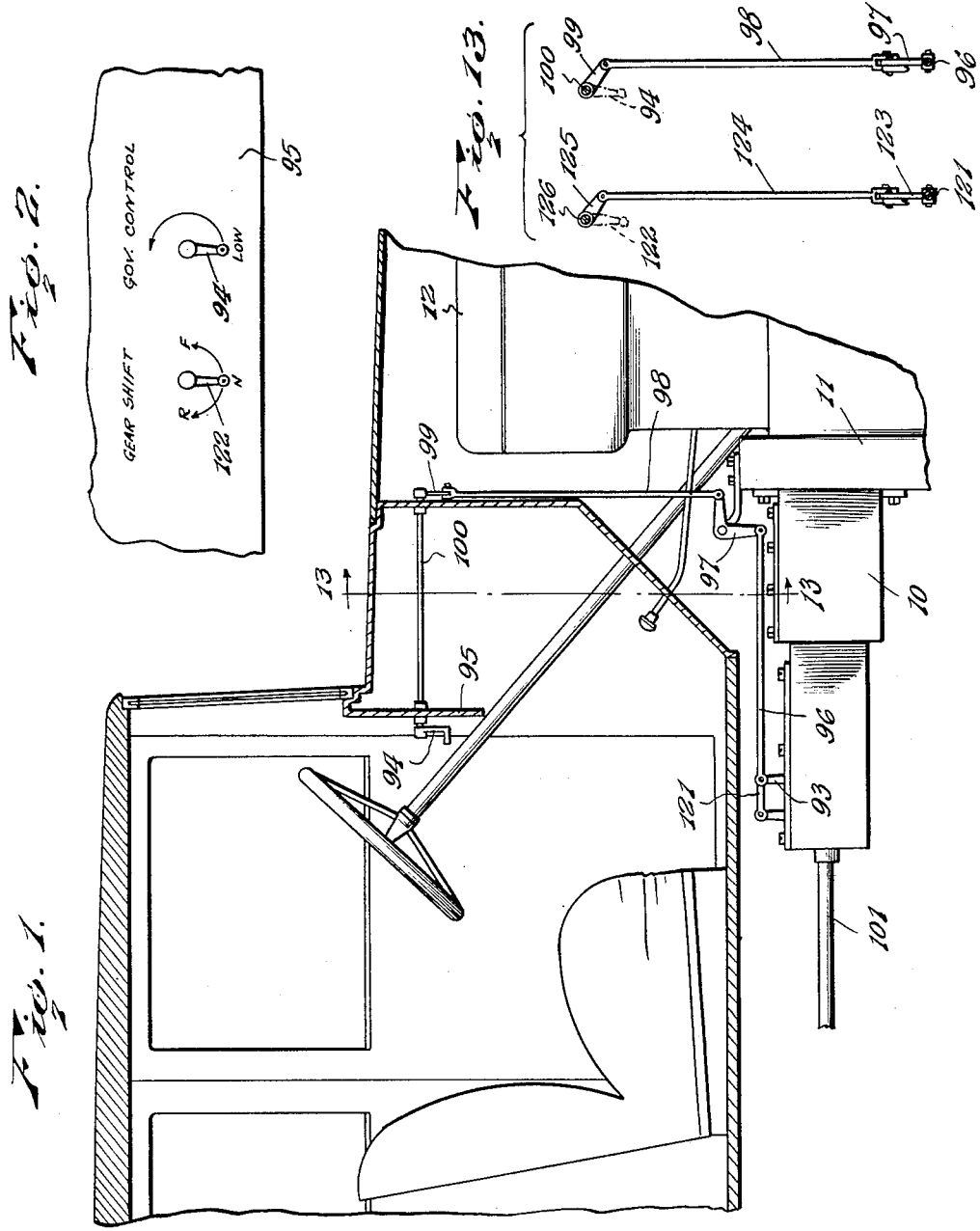

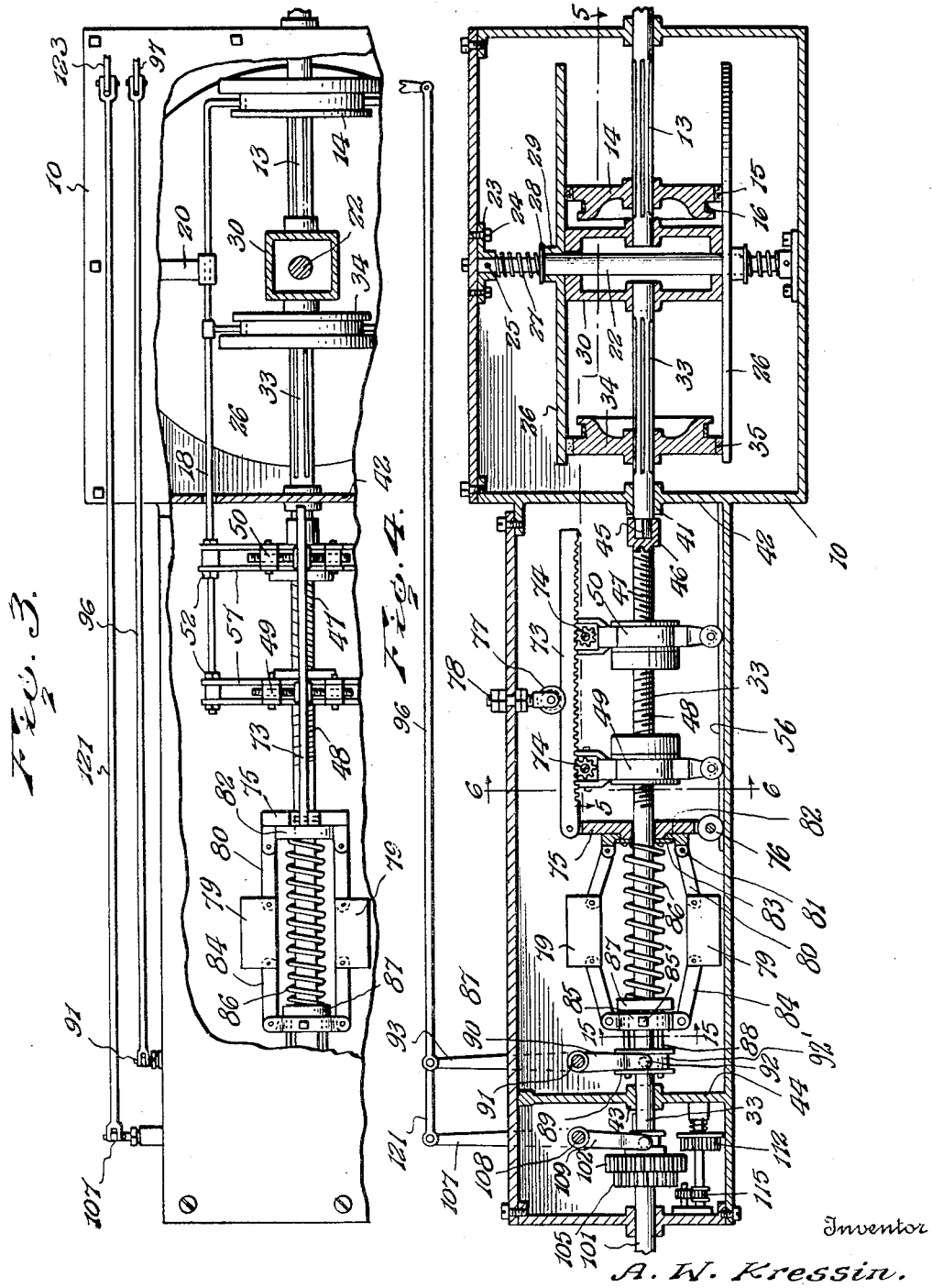

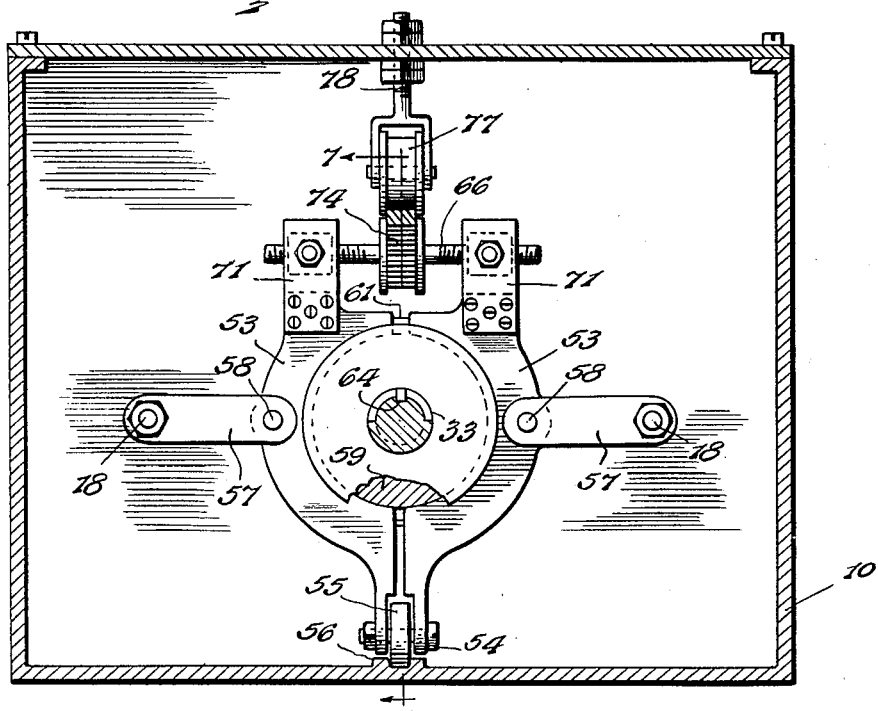
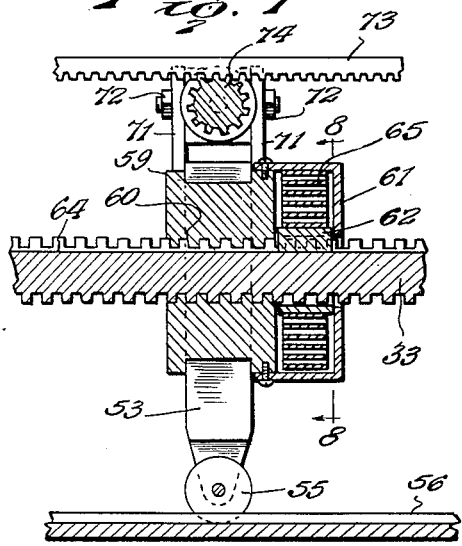
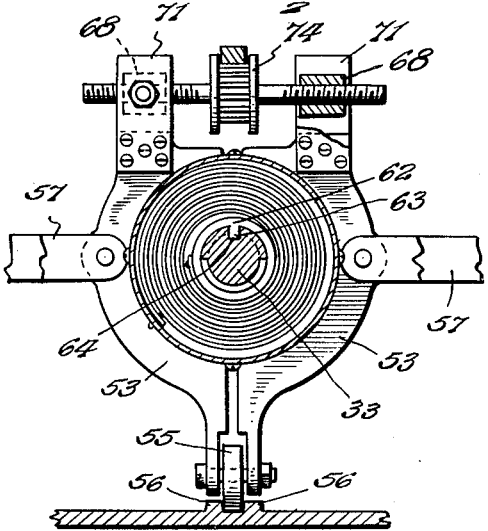
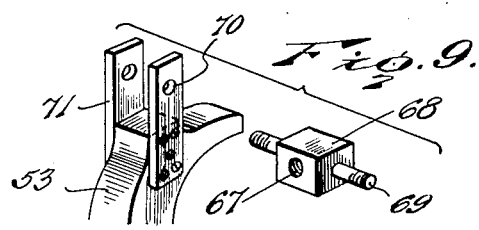

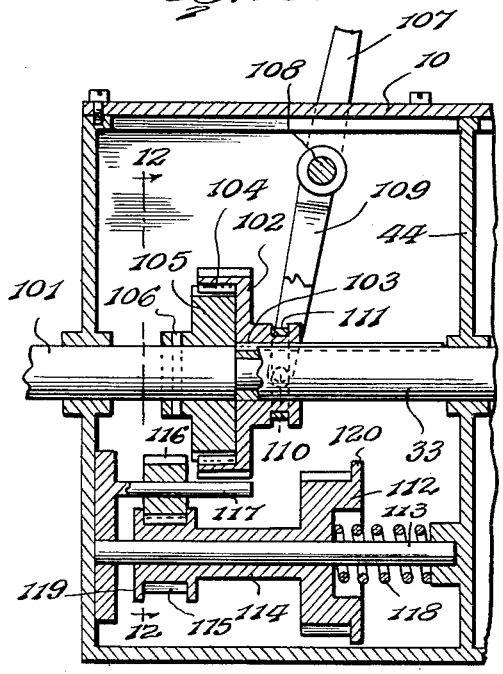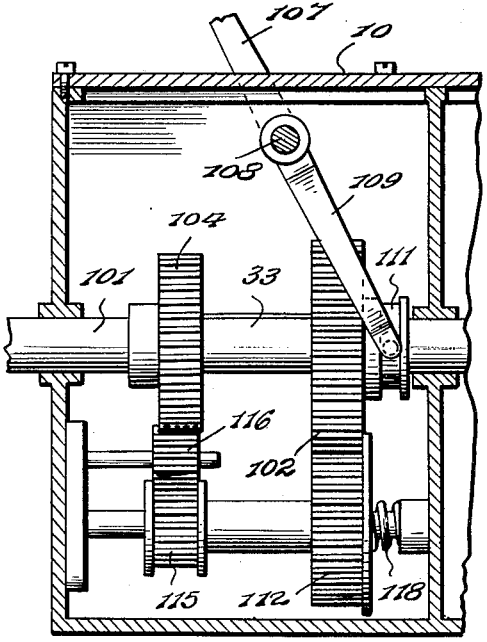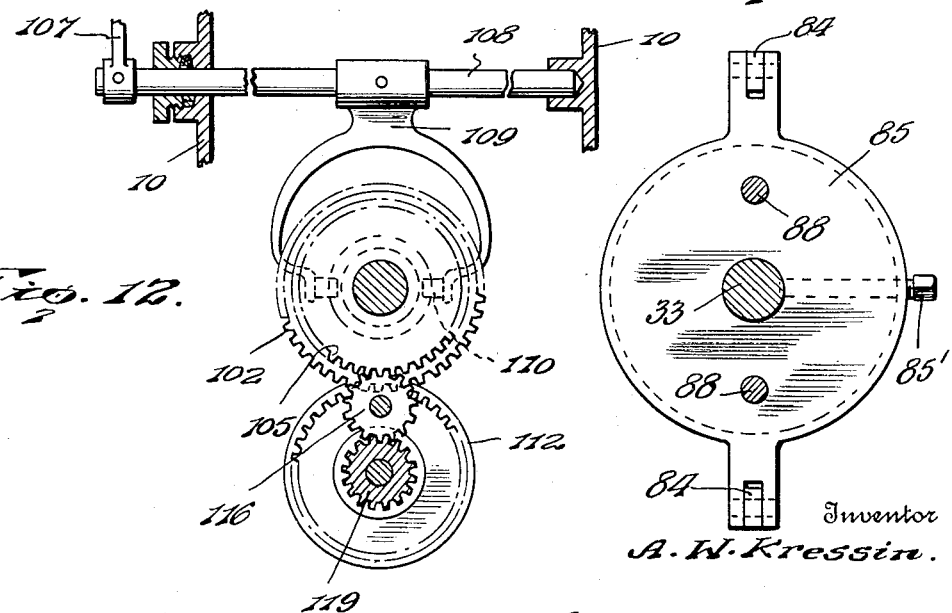

Patented Mar. 6, 1934

1,950,056

UNITED STATES PATENT OFFICE 1,950,056

VARIABLE SPEED TRANSMISSION

Arthur W. Kressin, Barney, N. Dak., assignor to Fremont J. Faust

Application October 21, 1932, Serial No. 638,974

8 Claims. (Cl. 74—97)

This invention relates to automotive transmissions and has for an object to eliminate the usual gear shift lever and provide a quiet smooth running transmission which may be controlled by two simple levers on the instrument board and the usual accelerator pedal.

A further object is to provide a variable speed transmission which will be automatically controlled by a governor to most efficiently utilize the power of the engine to drive the vehicle under various road conditions after controls, located on the instrument board, have been initially adjusted to suit the driving conditions to be encountered.

A further object is to provide a pair of novel shift plates, controlled by the governor, and fed along the drive shaft by right and left threads on the drive shaft and adapted to actuate the shiftable plates to vary the speed in accordance with opening and closing of the governor.

A further object is to provide a novel rack and pinion device which is operated by the governor and serves to open one shift plate and simultaneously close the other shift plate, thus stopping the rotation of the feed nut carried by the closed plate and causing it to travel on the drive shaft in accordance with the degree to which the governor is opened by the speed of the engine, the governor consequently only operating said rack and pinion devices and not being called upon to perform any heavy duty so that the efficient operation of the governor is assured at all times.

A further object is to provide a variable speed transmission in which the governor, rack and pinion devices, and shift plates coact, each time the vehicle is halted, to position the driving friction disk at the outer edges of the clutch disks and the driven friction disk near the hubs of the clutch disks, so that when the accelerator is again depressed to put the vehicle in motion, idling speed of the engine will initially impart slow speed to the drive shaft and insure positive starting without racing the engine and without danger of stalling the engine.

A further object is to provide a novel governor controlling spring and means for varying the tension thereof from the instrument board so that the governor may be adjusted to open faster or slower according to the driving conditions to be encountered.

A further object is to provide an extremely simple and effective gear train for connecting the sections of the drive shaft beyond the variable speed transmission, the gear train being controlled by a single lever on the instrument board to position the gears in either forward, neutral or reverse.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of my improved transmission in applied position,

Figure 2 is a front elevation of the gear shift and governor control levers,

Figure 3 is a fragmentary plan view of the transmission with the housing broken away to expose the mechanism, Figure 4 is a vertical longitudinal section through the transmission, Figure 5 is an enlarged fragmentary horizontal section taken on the line 5—5 of Figure 4, Figure 6 is an enlarged vertical cross section taken on the line 6—6 of Figure 4 showing one of the shift plates in elevation, Figure 7 is a vertical section taken on the line 7—7 of Figure 6, Figure 8 is a vertical section taken on the line 8—8 of Figure 7, Figure 9 is a detail perspective showing the toggle nut and mounting thereof, Figure 10 is a longitudinal section through the gear train with the parts in forward drive position, Figure 11 is a view similar to Figure 10 but showing the parts in reverse drive position, Figure 12 is a cross section taken on the line 12—12 of Figure 10.

Figure 13 is a vertical section on the line 13—13 of Figure 1.

Figure 14 is a detail view showing how the governor is connected to the rack, and Figure 15 is a detail section taken on the line 15—15 of Figure 4.

Referring now to the drawings in which like characters of reference designate similar parts in the various views, 10 designates the transmission housing which may be bolted to the fly-wheel housing 11 of the engine 12 and preferably is made oil tight to constitute a reservoir for about six quarts of lubricating oil.

As shown in Figure 4, the engine shaft 13 has splined thereon a disk 14 having a fiber wear surface 15. This disk will be hereinafter referred to as the driving friction disk. The disk is equipped with a ring groove 16 in which is seated a circular band 17, best shown in Figure 5. A pair of shift rods 18 are secured at their front ends to opposite sides of the band 17 and extend rearwardly through the housing 10, and are moved by shift plates, hereinafter described, to feed the friction driving disk longitudinally of the engine shaft 13. The rods slide through bearings 19 carried by brackets 20 which are bolted to the sides of the housing, as shown at 21.

As shown in Figures 4 and 5, a vertical shaft 22 is confined at its ends in suitable flanged plates 23 which are bolted, as shown at 24, to the top and bottom respectively of the housing. Pins 25 are passed through the ends of the shaft and through the plates to maintain the shaft stationary. Slidably and rotatably mounted on the shaft are a pair of parallel clutch disks 26 which are preferably formed of steel and frictionally engage the driving friction disk 14, and are rotated oppositely to each other thereby. The clutch disks are pressed toward each other by helical springs 27 which surround the ends of the shaft 22 and bear against the plates 23 and against washers 28 disposed in contact with the hubs 29 of the clutch disks.

A bracket 30 is fixed to the shaft 22 between the clutch disks and is of the general cross section shown in Figure 5. The bracket is provided with two bearings 31 and 32 in which the end of the engine shaft 13 and the end of a drive shaft 33 are journaled respectively, and which maintain said shafts in proper alignment to each other.

A friction disk 34, preferably a duplicate of the driving friction disk 14, is splined on the drive shaft 33, which is alined with the engine shaft and is preferably provided with a fiber wear surface 35 which is adapted to engage both clutch disks 26. The disk 34 will be hereinafter referred to as the driven friction disk since it is driven by the clutch disks 26 to drive the drive shaft 33. As shown in Figure 5, the driven friction disk is provided with a ring groove 36 which receives a circular band 37. Links 38 are secured to opposite sides of the band and are provided with collars 39 which receive the above mentioned shift rods 18. Set screws 40 secure the collars to the rods so that when the rods are shifted forwardly or rearwardly the driven friction disk 34 will move as a unit with the driving friction disk 14.

Preferably the driving and driven friction disks are so spaced relative to each other on the shift rods 18 that when the driving friction disk is disposed near the hubs of the clutch disks 26 the driven friction disk will be disposed near the outer circumferences of the clutch disks, and vice versa.

The drive shaft 33 is journaled in a bearing 41 carried by a partition 42 in the housing 10 and is also journaled near its rear end in a bearing 43 carried by a partition 44 in the housing. Preferably also the drive shaft is formed sectional, the sections being connected by a squared neck 45 and a socket 46. Furthermore, the drive shaft, near the front partition 42, is provided with a right thread 47 and beyond the right thread is provided with a left thread 48.

The shift rods 18 are connected at its rear ends to a pair of shift plates 49 and 50, shown in detail in Figures 6, 7 and 8. The plates are assembled to move as a unit longitudinally of the drive shaft by nuts 51 and 52 threaded on to the shift rods and bearing against opposite sides of the plates 49 and 50, respectively. The plate 49 encircles the left thread 48 and the plate 50 encircles the right thread 47 of the drive shaft and each plate is shifted by its corresponding thread to shift the driving and driven disks longitudinally of their respective shafts to vary the speed ratio of the drive shaft with respect to the engine shaft.

The shift plates 49 and 50 are duplicates of each other and a description of one will suffice for both. By referring more particularly to Figures 6, 7 and 8, it will be seen that each plate comprises a pair of arcuate jaws 53 flexibly connected together at the bottom by means of a pivot bolt 54 which also serves as a bearing for a roller 55 which is engaged in a track 56 extending longitudinally of the bottom of the housing 10. The jaws are connected to the shift rods 18 by means of links 57 which are pivoted at the inner ends, as shown at 58, to the jaws so that the jaws may rock toward and away from each other on the pivot pin 54. Between the jaws a flanged nut 59 is rotatably mounted, the nut having a thread 60 which engages the corresponding thread on the drive shaft. The nut is provided on one side with a housing 61 which encircles the drive shaft and houses a collar 62 which is provided with a lug 63, best shown in Figure 8, that travels in a spline 64 formed in the drive shaft 33. A coil spring 65 is attached at one end to the collar and at the opposite end to the housing 61.

When the jaws 53 are open the nut 59 will rotate as a unit with the drive shaft 33 by virtue of the collar 62 being splined on the drive shaft and connected to the nut by the spring 65 and housing 61. However, when the jaws 53 are closed to tightly bind upon the nut 59, the nut is stopped from rotating with the shaft and is fed longitudinally of the shaft by the screw threads of the shaft, as will be understood. The traveling nut carries with it the jaws which constitute the shift plates and impart movement to the shift rods.

When the jaws of either shift plate are open the plate disengages from the corresponding feed nut 59, allowing the feed nut to freely rotate with the shaft, and when the jaws are closed on the feed nut, the feed nut travels and carries the jaws longitudinally of the shaft. Only one shift plate at a time is closed upon its feed nut. Consequently, as will be seen by referring to Figure 5, when the shift plate 49 has its jaws closed its feed nut will be slowly stopped from rotation and the thread 48 of the drive shaft will feed the plate rearward to shift the rods 18 and move the driving friction disk 14 rearward toward the hubs or centers of the clutch disks 26, and simultaneously move the driven friction disk 34 rearward toward the outer peripheral edges of the clutch disks 26. This increases the speed ratio of the drive shaft 33 with respect to the engine shaft 13.

Conversely, when the shift plate 50 has its jaws closed the corresponding feed nut will be stopped from rotating and the drive shaft will feed the plate forward to shift the rods 18 and move the driving friction disk forward toward the outer peripheral edges of the clutch disks 26, and simultaneously move the driven friction disk 34 forward toward the centers of the clutch disks 26. This decreases the speed ratio of the drive shaft 33 with respect to the engine shaft 13.

When the feed nut of either plate is being advanced by the corresponding drive shaft thread, the helical spring 65 will be wound up and will store up energy to turn the nut back to initial position as soon as the jaws of the shift plate are opened.

The controls which open and close the jaws of each plate are best shown in Figures 4, 5, 7, 8 and 9. The jaws of each shift plate are opened and closed by means of a pinion shaft 66 which has right and left threaded ends engaged in threaded openings 67 formed in toggle blocks 68, shown in perspective in Figure 9. Each toggle block is free to align itself with the pinion shaft by means of trunnions 69 which are engaged in bearing openings 70 formed in plates 71 on the jaws, the block being disposed between the plates. Nuts 72 are threaded on to the ends of the trunnions to retain the blocks in place.

A rack 73 engages the two pinions 74 on the respective shafts 66 of the shift plates 49 and 50, as shown best in Figure 4. The rack, at its rear end, is equipped with a downwardly extending bracket 75 which is provided at its bottom with a guide roller 76 that travels in the track 56. A similar guide roller 77 is secured to the top of the housing, as shown at 78, and bears upon the top of the rack to hold the rack in positive engagement with both pinions. A pair of governor fly balls 79 are provided with links 80 which are pivotally connected, as shown at 81, to a ring 82 which rotates on the face of the bracket 75 and is removably confined in place by a guide ring or flange 83 bolted to the bracket. Links 84 connect the fly balls to a collar 85 which is fixed on the drive shaft by means of a set screw 85'.

Closing of the governor fly balls will move the rack 73 forward. The pinion of the shift plate 49 will thereupon be rotated to open the jaws of said plate and release the corresponding feed nut allowing it to rotate with the drive shaft 33, while at the same time the pinion shaft of the shift plate 50 will be rotated to close the jaws thereof upon its feed nut causing the nut to cease rotating with the drive shaft and feed the shift plate 50 and both the driving friction disk and the driven friction disk forwardly to decrease the speed ratio of the drive shaft with respect to the engine shaft.

Conversely, when the rack is moved rearward by opening of the governor balls the rotation of the pinion shafts is reversed to free the jaws of the plate 50 from its feed nut and close the jaws of the plate 49 upon its feed nut so that the plate 49 will be fed by the drive shaft rearwardly to shift the driving and driven friction disks rearwardly and increase the speed ratio of the drive shaft relative to the engine shaft.

It will be noted that the sole duty of the governor balls is to operate the rack and pinion devices, above described, for opening and closing the jaws of the shift plates. Consequently, the governor is not called upon to perform any heavy duty and thus the efficient operation of the governor is assured under severe conditions of service, such as stiff oil in the housing. It will also be pointed out that since the governor balls close each time the vehicle comes to a full stop, the driving friction disk 14 will be positioned by the shift plate 50 at the outer edges of the clutch disks 26 and the driven friction disk 34 will be positioned near the centers of the clutch disks 26, so that the idling speed of the engine will initially impart slow speed to the drive shaft 33, when the accelerator is depressed to start the vehicle, as will hereinafter be described, and insure positive starting without racing the engine and without danger of stalling the engine. Thus easy and sure starting will be assured.

In order to vary the action of the governor, or speed-responsive device, so that the governor will open faster or slower, according to the driving conditions to be encountered, such as hilly country where great engine power must be employed, or fast driving on level roads where high speeds are desirable, a helical spring 86 is mounted on the drive shaft 33 and bears, at one end, against the flange 83 and at the opposite end against a collar 87 which is slidably mounted on the drive shaft 33. The collar 87 is connected by a series of pins 88 with a flanged collar 89. A shift lever 90 is pivoted, as shown at 91, within the housing and is forked to receive the collar 89. Gudgeons 92 connect the forked end of the shift lever with a ring 92' on the collar. When the shift lever is actuated to move the collars 89 and 87 forward as a unit the helical spring 86 will be compressed and exert frictional pressure against the flange 83, thereby retarding opening of the fly balls 79.

Conversely, when the shift lever is actuated to move the collars 89 and 87 rearwardly as a unit, tension on the spring 86 will be relieved and the frictional engagement between the flange 83 and spring will be reduced so that the fly balls may open more freely.

The shaft 91 of the shift lever 90 projects through the side of the housing and is equipped with a crank 93. The crank 93 is operatively connected to a control lever 94 on the instrument board 95, shown best in Figure 2, by means of a push rod 96, the forward end of which is connected to a bell crank 97, shown best in Figure 1, which in turn is connected to a stand rod 98, the upper end of which is connected to a crank 99 carried by a rock shaft 100 which projects through the instrument board and is equipped with the control lever 94, the lever 94 and the crank 99 being in angular relation, as seen in Figure 13.

It will now be apparent that when the governor control lever 94 is turned to its lowest or neutral position the spring 86 will be compressed by the collar 87 sufficiently to retard opening of the governor to suit normal or ordinary driving conditions in traffic. When the control lever 94 is turned counter clockwise the collar 87 will compress the spring against the ring 83 to retard opening of the governor so that movement of the driving friction disk 14 toward the centers of the clutch disks 26 is retarded. Thus the speed ratio of the engine shaft with respect to the drive shaft is controlled to utilize high speed of the motor in negotiating hills, mountains and the like.

Conversely, when the control lever 94 is turned clockwise from its neutral or lowest point the collar 87 will be retracted to relieve tension of the spring 86 against the ring 83 so that the fly balls may more readily open and permit the driving friction disk 14 to move readily toward the centers of the clutch disks 26 whereby low speed of the motor may be utilized to speed up the drive shaft 33 and facilitate fast driving on level roads at slower engine speed than ordinarily would be the case.

By now referring to Figures 4, 10, 11 and 12, it will be seen that the drive shaft 33 is split transversely between the second partition 44 and the rear end wall of the housing so that an extension or propeller shaft 101 passes from the housing to the differential. The drive shaft and extension are geared together as follows:

A gear 102 is splined on the drive shaft 33, as shown at 103, and is provided with an integral gear 104 which meshes with a gear 105 that is keyed to the extension shaft 101, as shown at 106. A shift lever 107 is secured to a crank shaft 108 which passes through the housing and is equipped with a crank lever 109 having forked ends pivoted, as shown at 110, to a ring 111 that encircles a groove formed in the hub of the splined gear 102. When the lever 109 is rocked to one limit of its movement the gears 102 and 105 are locked together to directly connect the drive shaft 33 with the extension 101 for movement as a unit in the same direction, as shown in Figure 10.

For reversing the direction of rotation of the extension shaft with respect to the drive shaft, a gear 112 is mounted to slide on a counter shaft 113 and is provided with an integral sleeve 114 which encircles the counter shaft and terminates in a flanged gear 115. A pinion 116 is mounted to slide on a stub shaft 117 disposed between the extension shaft 101 and stub shaft 113, said pinion meshing with the gear 115 at all times. A helical spring 118 is mounted on the counter shaft 113 and exerts endwise pressure against the gear 112 to normally hold the gear at its rearward limit of movement on the stub shaft 113. The flanges 119 on the gear 115 confine the pinion for sliding movement as a unit with the gear 112 under action of the spring 118, or under action of the shift lever 109, as will now be described.

It will be noted that a flange 120 is formed on the gear 112. When the shift lever 109 is shifted to withdraw the gear 102 from the gear 105, the gear 102 will be moved forwardly along the drive shaft 33 and lodge against the flange 120 of the gear 112, whereupon further movement of the gear 102 will move the gear 112 bodily forward against the tension of the spring 118. This movement of the gear 112 carries the gear 115 and pinion 116 along with the gear 112 until the pinion 116 arrives into mesh with the gear 104. Movement of the drive shaft 33 is thereupon imparted to the extension 101 in a reverse direction, as shown in Figure 11.

The neutral position of the gear 102 is obtained by moving the lever 109 sufficiently to withdraw the gear 102 from the gear 105 and halting sliding movement of the gear 102 on the drive shaft 33 to just clear the gear 112.

For operating the shift lever crank 107, as best shown in Figures 3 and 4, a push rod 121 is secured to the crank outside of the housing and at its forward end is operatively connected to a control lever 122 on the instrument board 95 by means of a bell crank 123, a stand rod 124, a crank 125, and a rock shaft 126, as will be seen by referring to Figure 13.

As shown in Figure 2, movement of the gear shift control lever 122 counter clockwise places the gear train, just described, in forward drive position. Movement of the lever clockwise past the neutral point places the gear train in reverse. When the control lever is in neutral or low limit of movement, the gear train is disconnected and permits the engine being run to test the operation of the transmission or to permit the engine to idle when the vehicle is not in motion.

From the above description it is thought that the construction and operation of my invention will be thoroughly understood without further explanation.

What is claimed is:

1. In an automotive transmission, the combination of an engine shaft, a driving friction disk splined thereon, parallel clutch disks frictionally engaging the driving disk at opposite points, a drive shaft in alignment with the engine shaft, a driven friction disk splined on the drive shaft and engaging the clutch disks diametrically opposite the driving friction disk, shift plates having right and left screw thread connections with the drive shaft, shift rods connecting the shift plates as a unit with the driving and driven friction disks, and speed responsive means for automatically rendering one of the shift plates active and the other shift plate inoperative whereby to shift said friction disks in a radial direction on said clutch disks.

2. In an automotive transmission, the combination of an engine shaft, a driving friction disk splined thereon, spring pressed clutch disks frictionally engaging opposite points on the driving disk, a drive shaft having oppositely threaded portions, a driven disk splined on the drive shaft and engaging the clutch disks diametrically opposite the driving friction disk, a pair of shift plates operatively connected as a unit to the driving and driven disks and having pivoted jaws, revoluble nuts carried by the jaws adapted to engage the threaded portions of the drive shaft when the jaws are closed and be fed longitudinally of the drive shaft and adapted to disengage from the threaded portions of the drive shaft and idle when the jaws are open, and speed responsive means for closing the jaws of one shift plate and opening the jaws of the other shift plate whereby to move the friction driving and driven disks in a predetermined direction radially of the clutch disks.

3. In an automotive transmission, the combination of an engine shaft, a driving friction disk splined thereon, clutch disks adapted to frictionally engage opposite points of the driving friction disk, a drive shaft aligned with the engine shaft and having oppositely threaded portions, a driven friction disk splined on the drive shaft and engaging the clutch disks opposite the driving friction disk, a pair of shift plates having pivoted jaws, revoluble nuts carried by the jaws surrounding the respective threaded portions of the drive shaft, shift rods operatively connected to the driven and driving disks to move said disks as a unit radially upon the clutch disks, yielding key devices operatively connected to said nuts for guiding the nuts longitudinally of the drive shaft when the jaws of the shift plates are closed to prevent idling of the nuts, said nuts being thereupon fed by said threaded portions of the shaft longitudinally of the shaft in a direction corresponding to the direction of the respective thread, a governor on the drive shaft, a rack moved by the governor, and pinion shafts moved by the rack for closing the jaws of one shift plate upon its nut and simultaneously opening the jaws of the other shift plate with respect to its nut for moving said shift plates independently of each other.

4. In an automotive transmission, the combination of an engine shaft, a driving friction disk splined thereon, clutch disks frictionally engaging the driving disk, a drive shaft, a driven friction disk splined on the drive shaft and engaging the clutch disks opposite the driving friction disk, shift plates arranged to be actuated by the drive shaft and operatively connected to both friction disks to move said friction disks radially upon the clutch disks, a centrifugal governor on the drive shaft automatically controlling the shift plates to connect them with or release them from the drive shaft, a spring exerting tension on the governor to retard or accelerate opening and closing thereof, and means for manually controlling the tension of the spring.

5. In an automotive transmission, the combination of an engine shaft, a driving friction disk splined thereon, clutch disks adapted to frictionally engage the driving disk, a drive shaft, a driven friction disk splined on the drive shaft and engaging the clutch disks opposite the driving friction disk, shift plates actuated by the drive shaft and operatively connected to both friction disks to move said disks radially as a unit upon the driven disks, governor fly balls, a bracket, an annular member on the bracket, links operatively connecting the fly balls to the annular member to move said bracket longitudinally of said drive shaft, a rack and pinion device operatively connecting said bracket with said shift plates to control the plates, a helical spring surrounding the drive shaft and exerting endwise pressure against said bracket to retard or accelerate opening and closing of the fly balls, and means for manually controlling the tension of the spring.

6. In an automotive transmission, the combination of an engine shaft, a driving friction disk splined thereon, clutch disks spring pressed toward each other and adapted to frictionally engage the driving disk at diametrically opposite points thereof, a drive shaft, a driven friction disk splined on the drive shaft and engaging the clutch disks diametrically opposite the driving friction disk, shifting means actuated by the drive shaft and operatively connected to both the driving disk and the driven disk to move said disks radially as a unit upon the clutch disks, a vertical rod upon which the clutch disks are mounted, a bracket between the clutch disks around said rod, and bearings in the bracket in which the opposed ends of the drive shaft and the engine shaft are journaled.

7. In an automotive transmission, the combination of an engine shaft, a driving friction disk splined theron, clutch disks frictionally engaging the driving disk, a drive shaft, a driven friction disk splined on the drive shaft and engaging the clutch disks opposite the driving disk, shifting means actuated by the drive shaft and operatively connected to the driving disk and to the driven disk to move said disks as a unit radially upon the clutch disks, speed responsive means on the drive shaft automatically controlling the shifting means to vary the relative positions of the driving and driven disks with respect to the clutch disks, a coil spring exerting clamping pressure upon the speed-responsive means, a collar bearing against one end of the spring, a second collar connected with the first collar, the collars being disposed at opposite sides of the base member of the speed-responsive means, and a lever operatively connected to the second collar for varying the tension of the spring.

8. In an automotive transmission, the combination of a variable speed friction transmission including driving and driven elements, a drive shaft, a pair of shift plates surrounding the drive shaft each having pivoted jaws, a pinion shaft for opening and closing the jaws of each plate, a rack for operating the pinion shafts of both plates, a nut idling between the jaws of each plate on the drive shaft, right and left threads formed on the drive shaft, a collar carried by each shift plate splined to said drive shaft, a coil spring connecting each shift plate nut to the adjacent collar and being wound up when the jaws of the shift plates are closed to stop rotation of the nut and feed the nut longitudinally of the shaft, said spring unwinding to return the nut to initial position when said jaws are opened, and speed responsive means connected to said rack for opening the jaws of one shift plate and closing the jaws of the other shift plate.

ARTHUR W. KRESSIN. [L. S.]